(12) United States Patent
Tai et al.

(10) Patent No.: US 10,555,594 B2
(45) Date of Patent: Feb. 11, 2020

(54) BACKPACK CONFIGURED TO DISSIPATE HEAT

(71) Applicant: Gizmospring.com Dongguan Limited, Dongguan (CN)

(72) Inventors: Kenny Chih-Yao Tai, Dongguan (CN); Daniel Pettersson, Dongguan (CN)

(73) Assignee: Gizmospring.com Dongguan Limited, Dongguan (CN)

( * ) Notice: Subject to any disclaimer, the term of this patent is extended or adjusted under 35 U.S.C. 154(b) by 0 days.

(21) Appl. No.: 16/038,053

(22) Filed: Jul. 17, 2018

(65) Prior Publication Data

US 2019/0014886 A1     Jan. 17, 2019

Related U.S. Application Data

(60) Provisional application No. 62/671,289, filed on May 14, 2018, provisional application No. 62/533,496, filed on Jul. 17, 2017.

(30) Foreign Application Priority Data

Sep. 13, 2017    (CN) .......................... 2017 1 0823671

(51) Int. Cl.
     *A45F 3/04*         (2006.01)
     *H02J 7/00*         (2006.01)
     *A45F 3/12*         (2006.01)

(52) U.S. Cl.
CPC .............. *A45F 3/04* (2013.01); *H02J 7/0052* (2013.01); *A45F 2003/125* (2013.01); *H02J 2007/0062* (2013.01)

(58) Field of Classification Search
CPC . A45F 3/04; A45F 2003/003; A45F 2003/125
See application file for complete search history.

(56) References Cited

U.S. PATENT DOCUMENTS

| | | | |
|---|---|---|---|
| 5,823,414 A | 10/1998 | Gal et al. | |
| 5,836,671 A | 11/1998 | Chien | |
| 7,249,464 B1 * | 7/2007 | Watson | ..................... A45F 3/04 62/259.3 |

(Continued)

FOREIGN PATENT DOCUMENTS

| | | |
|---|---|---|
| CN | 201468227 | 5/2010 |
| CN | 203424539 | 2/2014 |

(Continued)

OTHER PUBLICATIONS

International Search Report and Written Opinion, dated Oct. 10, 2018, received in Interanational Application No. PCT/US2018/042544.

(Continued)

*Primary Examiner* — Justin M Larson
(74) *Attorney, Agent, or Firm* — Davis Wright Tremaine LLP; Heather M. Colburn

(57) ABSTRACT

A backpack that includes a backpack body and an air moving device. The backpack body has at least one air duct formed therein. The air moving device provides an airflow to the at least one air duct. The at least one air duct is configured to deliver the airflow to a back of a wearer, which dissipates heat along the back of the wearer.

31 Claims, 9 Drawing Sheets

(56) References Cited

U.S. PATENT DOCUMENTS

| | | | |
|---|---|---|---|
| 7,272,946 B2* | 9/2007 | Ichigaya | A41D 13/0025 |
| | | | 62/259.3 |
| 7,900,757 B2 | 3/2011 | Sisitsky | |
| 9,204,674 B2* | 12/2015 | Bujold | A41D 13/0025 |
| 2010/0116861 A1 | 5/2010 | Burrowes | |
| 2015/0075185 A1* | 3/2015 | Sims | F28F 1/00 |
| | | | 62/3.5 |
| 2017/0023267 A1 | 1/2017 | Strauss | |
| 2017/0181529 A1 | 6/2017 | Tatsumi | |
| 2019/0075912 A1* | 3/2019 | Squires | A45F 3/04 |
| 2019/0093929 A1* | 3/2019 | Ye | F25B 21/02 |

FOREIGN PATENT DOCUMENTS

| | | | |
|---|---|---|---|
| CN | 105342103 | | 2/2016 |
| CN | 205040889 U | * | 2/2016 |
| DE | 202013011211 | | 5/2014 |
| JP | 2004147871 A | * | 5/2004 |
| JP | 6327778 B1 | * | 5/2018 |

OTHER PUBLICATIONS

Tec Snake Ltd., "ACOOL Bag: The World's Best Cooling Backpack," 2019, [Retrieved on Jul. 3, 2019] Retrieved from the Internet: https://www.indiegogo.com/projects/acool-bag-the-world-s-best-cooling-backpack#/.

https://www.amazon.co.jp/ZenCT-%E3%82%AF%E3%83%BC%E3%83%AB%E3%83%95%E3%82%A1%E3%83%B3%E4%BB%98%E3%81%8D-%E8%92%B8%E3%82%8C%E3%81%AA%E3%81%84%E5%BF%AB%E9%81%A9%E3%83%AA%E3%83%A5%E3%83%83%E3%82%AF-PC%E3%83%AA%E3%83%A5%E3%83%83%E3%82%AF%E3%82%B5%E3%83%83%E3%82%AF-%E3%83%91%E3%82%BD%E3%82%B3%E3%83%B3%E3%83%90%E3%83%83%E3%82%B0/dp/B07QNVKKH1/ref=pd_sbs_200_3/358-9551621-5693551?_encoding=UTF8&pd_rd_i=B07QNVKKH1&pd_rd_r=019c014e-9c92-11e9-9a4d-29d7ab25ea42&pd_rd_w=yeYlb&pd_rd_wg=qdEJ7&pf_rd_p=ad2ea29d-ea11-483c-9db2-6b5875bb9b73&pf_rd_r=Q8GV1JFXC5AQXTB9NS2R&psc=1&refRID=Q8GB1JFXC5AQXTB9NS2R.

https://www.amazon.co.jp/%E3%82%B5%E3%83%B3%E3%82%B3%E3%83%BC-%E4%B8%89%E3%81%A4%E8%91%89-BAKPKCL3-%E3%82%AF%E3%83%BC%E3%83%AB%E3%83%95%E3%82%A1%E3%83%B3%EF%BC%86%E3%83%92%E3%83%BC%E3%82%BF%E3%83%BC-in%E3%80%8C%E8%92%B8%E3%82%8C%E3%81%AA%E3%81%84%E5%BF%AB%E9%81%A9%E3%83%AA%E3%83%A5%E3%83%83%E3%82%AF%E3%80%8D-CLWRBKPK-%E2%80%BB%E6%97%A5%E6%9C%AC%E8%AA%9E%E3%83%8B%E3%83%A5%E3%82%A2%E3%83%AB%E4%BB%98%E3%81%8D%-E3%82%B5%E3%83%B3%E3%82%B3%E3%83%BC%E3%83%AC%E3%82%A2%E3%83%A2%E3%83%8E%E3%82%B7%E3%83%A7%E3%83%83%E3%83%97/dp/B07DBZ32X2/ref=sr_1_2?_mk_ja_jp=%E3%82%AB%E3%82%BF%E3%82%AB%E3%83%8A&keywords=CLWRBKPK&qid=1562048527&s=sports&sr=1-2catcorr.

* cited by examiner

BACKPACK CONFIGURED TO DISSIPATE HEAT

CROSS REFERENCE TO RELATED APPLICATIONS

This application is a continuation-in-part of Chinese Patent Application No. 201710823671.1, filed on Sep. 13, 2017, and claims the benefit of U.S. Provisional Patent Application No. 62/533,496, filed on Jul. 17, 2017, and U.S. Provisional Patent Application No. 62/671,289, filed on May 14, 2018. Each of the aforementioned applications are incorporated herein by reference in their entireties.

BACKGROUND OF THE INVENTION

Field of the Invention

This invention is directed generally to backpacks, and more particularly to backpacks designed to dissipate heat.

Description of the Related Art

As a tool that can be worn on the back and have items hung thereon, a backpack is commonly used in tourism, study, and daily life. At present, most backpacks include a backing pad of soft cloth or hard plastic. When worn, the backing pad of a backpack often presses against the back of the human wearer, and causes a great deal of heat to collect along the wearer's back. People wearing a backpack on their back may perspire easily, causing the backing pad to be wetted and polluted by sweat, which can cause discomfort. In addition, people usually take a cellphone with them. When the battery of the cellphone is depleted, the battery should be charged. Unfortunately, mobile charging or in-pocket charging is often inconvenient and causes people to be insecure.

DETAILED DESCRIPTION

Figure 1:
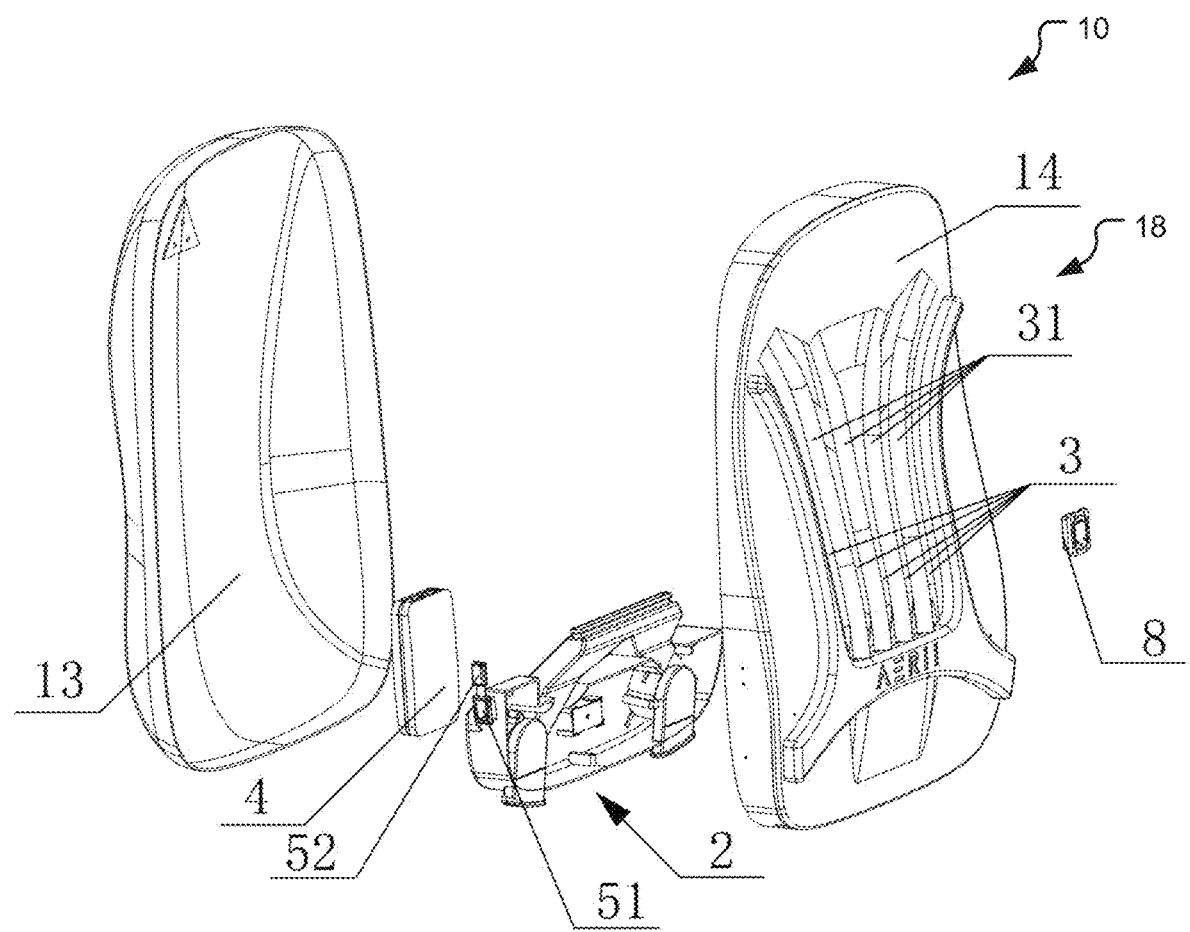
FIG. 1 is a partially exploded perspective view of a backpack.

FIG. 1 illustrates a backpack 10 configured to be worn on a back of a human wearer and to help dissipate heat along the wearer's back. The backpack 10 includes a backpack body 18 and an air moving or outlet device 2. The backpack body 18 has a back surface (e.g., a backing pad) configured to contact the back of the human wearer. The back surface includes one or more channels or air ducts 3, which are connected to the air outlet device 2. In the embodiment illustrated, the air ducts 3 include five separate air ducts. However, this is not a requirement.

Figure 3:
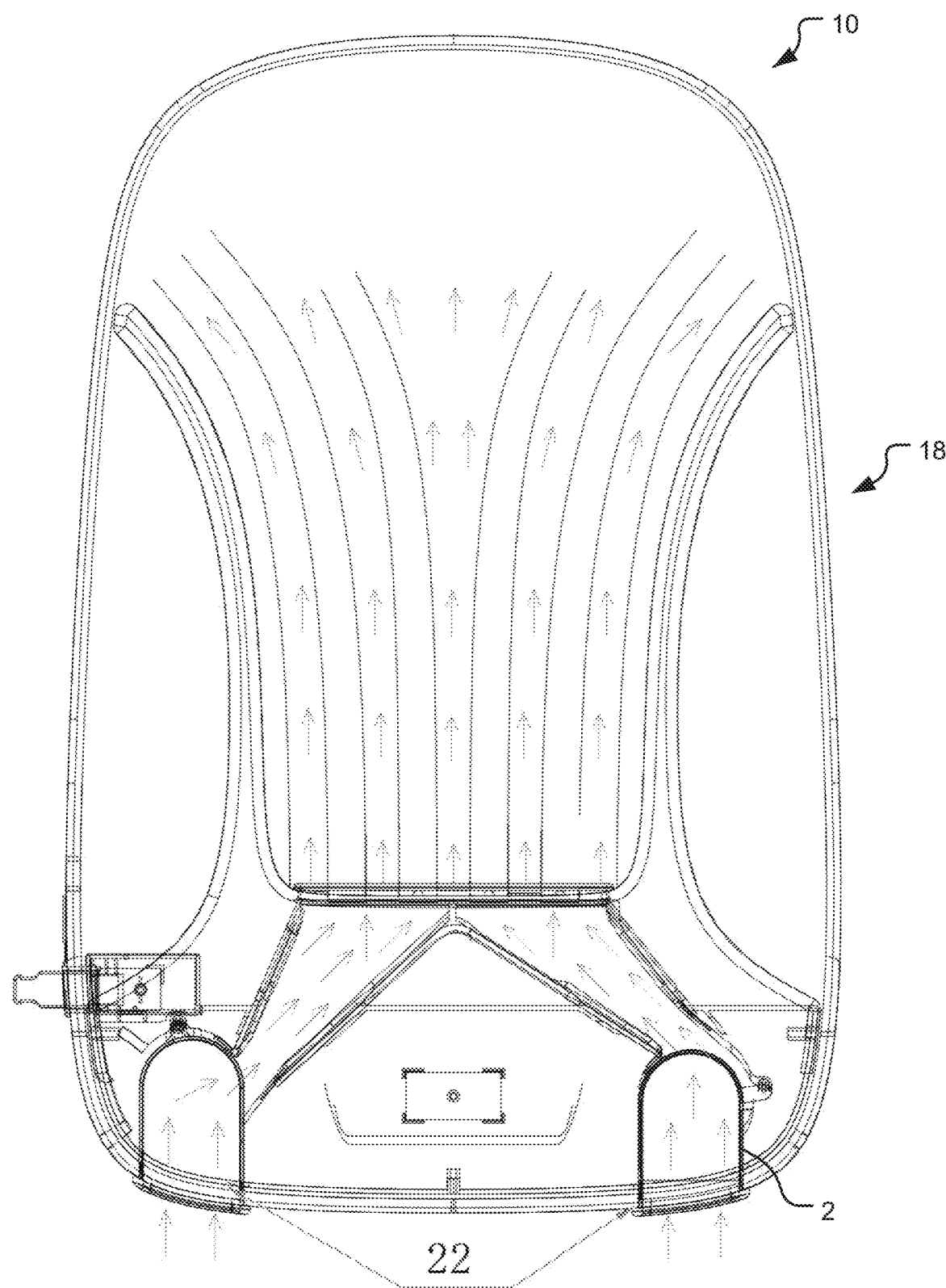
FIG. 3 is an air motion diagram illustrating airflow caused by the exemplary air outlet device of FIG. 2.

In the embodiment illustrated, the air ducts 3 are positioned against and extend along the back of the human wearer. When the air outlet device 2 is turned on, the air outlet device 2 blows air into the air ducts 3, which increases airflow between the back of the human wearer and the air ducts 3. This airflow (illustrated as arrows in FIG. 3) replaces heated or higher-temperature air positioned between the back of the human wearer and the air ducts 3 with lower-temperature air. In this way, the heat between the back of the human wearer and the air ducts 3 may be quickly dissipated and the temperature of the back of the human wearer lowered. The air outlet device 2 may be positioned at the lower part of the backpack body 18. Accordingly, the airflow created by the air outlet device 2 (illustrated as arrows in FIG. 3) blows upwardly from the bottom (or a lower portion) of the backpack body 18 and may easily reach the whole back or a majority portion thereof to enhance the heat dissipation.

In the embodiment illustrated, the back surface includes strip projections 31 that are positioned between adjacent ones of the air ducts 3. The strip projections 31 help reduce contact area and friction between the back surface (e.g., the backing pad) and the back of the wearer. This may help reduce the amount of sweat on the back and mitigate the accumulation of heat. The strip projections 31 allow the lower-temperature air to flow through the air ducts 3 and in between the back surface and the back of the wearer. The strip projections 31 may lengthen the flowing distance, and improve the heat dissipation (or radiation). The strip projections 31 may also restrict lateral flow of the air flowing along the wearer's back from the air ducts 3. Thus, the air ducts 3 may deliver a portion of the airflow to less than the wearer's entire back.

Figure 4:
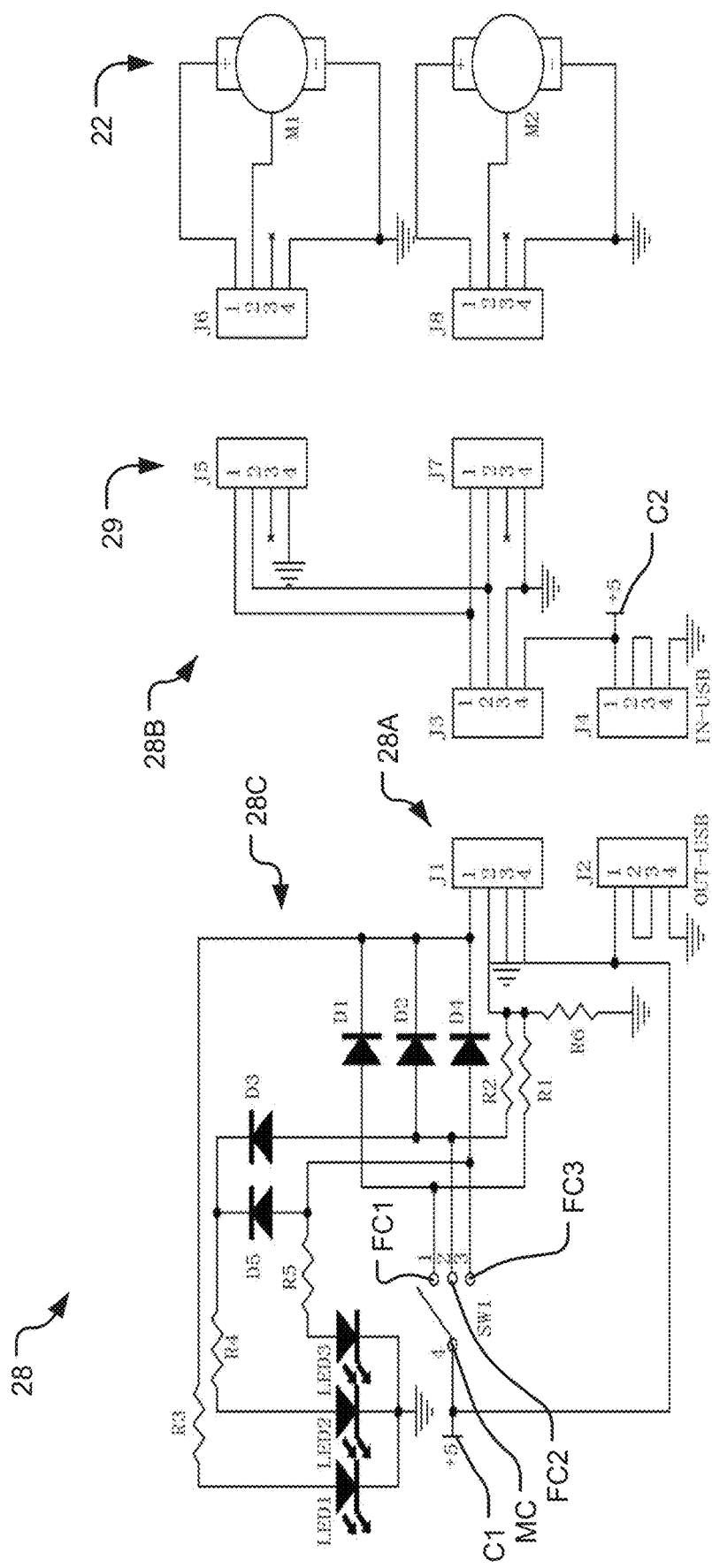
FIG. 4 is a circuit diagram of a multi-level speed-regulating module of the backpack of FIG. 1.

As indicated in FIG. 1, in this embodiment, the backpack body 18 includes a charging interface 51 configured to be connected to external electrical equipment (not shown) and to provide electricity to the external electrical equipment (e.g., to charge a battery of the external electrical equipment). The charging interface 51 may protrude outside the backpack body 18. The charging interface 51 is configured to provide mobile charging to the external electrical equipment (for example, a cellphone). As indicated in FIG. 1, in this embodiment, the backpack body 18 is provided with a power supply 4 configured to provide power to the air outlet device 2 and the charging interface 51. The power supply 4 may be implemented as a removable and/or external power supply. The charging interface 51 may be implemented as a power output interface J2 (see FIG. 4), which may be implemented as a Universal Serial Bus ("USB") port or similar connection. Referring to FIG. 4, the power output interface J2 may be connected to the external electrical equipment (not shown). By way of non-limiting examples, the external electrical equipment (not shown) may be implemented as a common cellphone, a flashlight, or an electric lamp.

Figure 2:
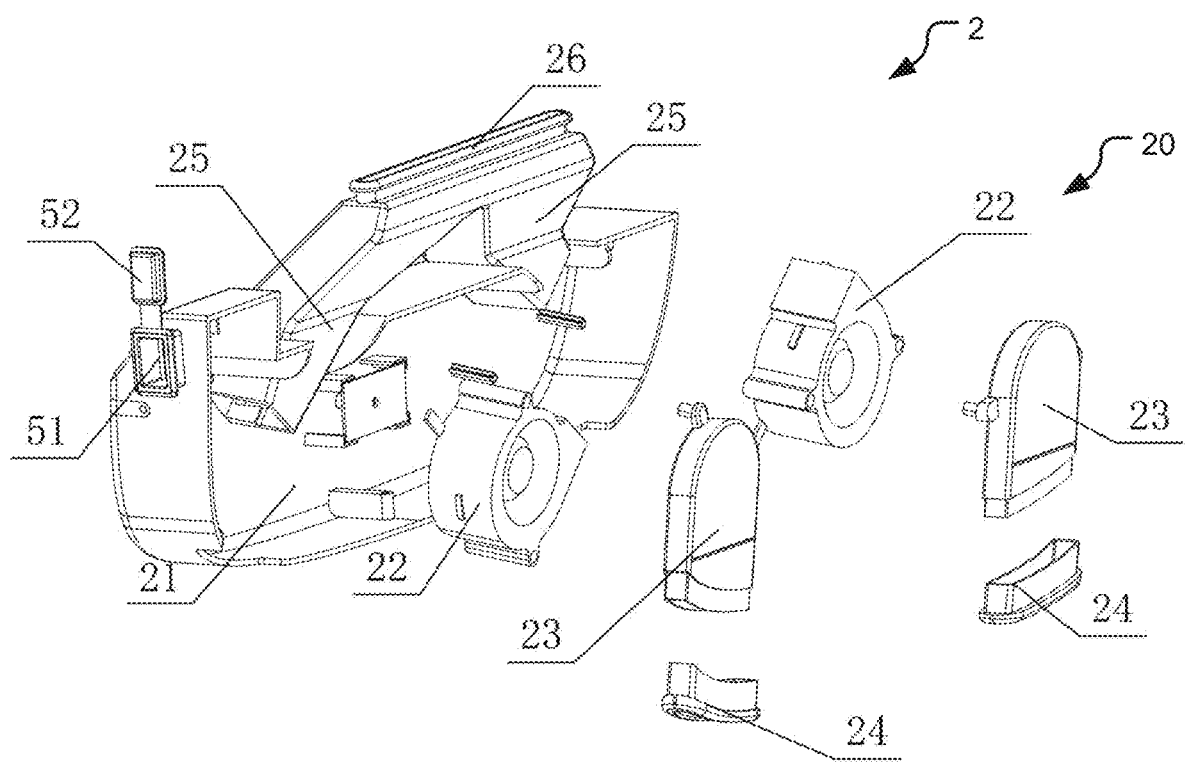
FIG. 2 is an exploded view of an exemplary air moving or outlet device of the backpack of FIG. 1.

As indicated in FIGS. 1 and 2, in this embodiment, the charging interface 51 is provided with a removable protective cover 52. When the protective cover 52 is on the charging interface 51, the protective cover 52 may protect the charging interface 51 from dust, water, etc. Referring to FIG. 1, when the protective cover 52 is on the charging interface 51, the protective cover 52 may hide the charging interface 51 to give a side surface of the backpack body 18 a smooth and aesthetically pleasing appearance.

In this embodiment, the back surface of the backpack body 18 that contacts the back of human wearer is provided with a waterproof and breathable layer, which includes a hydrophobic binder and aggregate wrapped with a hydrophobic material. The aggregate includes the following components and percentages by weight: Quartz sand (20-65% by weight); Ceramsite (15-55% by weight); and slag (5-35% by weight). The quartz sand may have a particle diameter of 0.02 mm to 12 mm). The Ceramsite may have a particle diameter of 0.05 mm to 0.18 mm. The slag may have a particle diameter 0.15 mm to 0.45 mm. The waterproof and breathable layer may help improve the water-tightness of the backpack 10 and/or the breathability of the backpack 10, which may help enhance the effect of the heat dissipation.

As indicated in FIG. 2, in this embodiment, the air outlet device 2 includes a housing 21, a multi-level speed-regulating module 28 (see FIG. 4), and at least one fan or blower 20. In the embodiment illustrated, the at least one blower 20 has been implemented as a pair of first blowers 22. However, in alternate embodiments, the at least one blower 20 may be implemented as a single fan or blower (not shown). By way of another non-limiting example, the at least one blower 20 may include the first blowers 22, one or more second blowers 6 (see FIG. 5), and one or more third blowers 7 (see FIG. 6).

Figure 5:
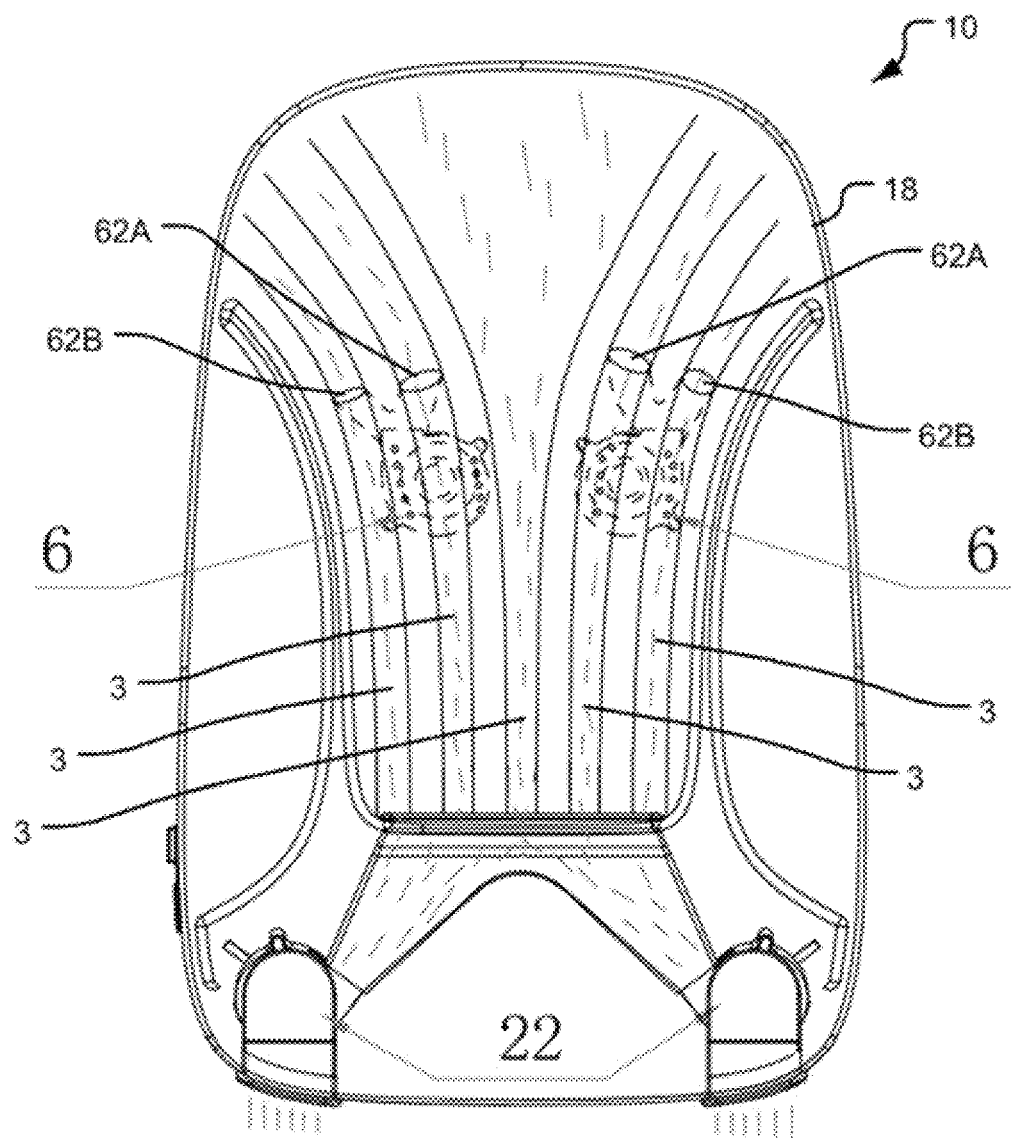
FIG. 5 is an air motion diagram illustrating airflow caused by optional second blowers of the backpack of FIG. 1.

The at least one blower 20 is positioned to receive air from outside the backpack body 18 (see FIGS. 1, 3, 5, 6, and 8) and blow the received air into the air ducts 3 (see FIGS. 1 and 5). Thus, each blower 20 may be positioned to receive the lower temperature air from a corresponding air intake channel or cavity 23 and to blow that air into a corresponding air outlet duct 25. Alternatively, the housing 21 and/or the backpack body 18 may include air intake openings that allow the lower temperature air to flow into the housing 21. In such embodiments, each blower 20 may be positioned to blow the lower temperature air from inside the housing 21 into the corresponding air outlet duct 25.

The multi-level speed-regulating module 28 (see FIG. 4) is connected to the at least one blower 20 and controls the speed thereof. By controlling the speed of the at least one blower 20, the multi-level speed-regulating module 28 (see FIG. 4) determines how quickly the received air flows from the at least one blower 20 and into the air ducts 3 (see FIGS. 1 and 5).

In the embodiment illustrated, the multi-level speed-regulating module 28 (see FIG. 4) and the first blowers 22 are positioned in the housing 21. Each of the first blowers 22 is connected to the multi-level speed-regulating module 28 (see FIG. 4). The multi-level speed-regulating module 28 (see FIG. 4) controls the speed of the first blowers 22. The first blowers 22 are provided with an air guide opening, which is used to exhaust the air generated by the first blowers 22 uniformly through an air opening (e.g., into the corresponding air outlet duct 25). The air guide opening also guides the air or controls the direction of the air in a manner that increases air pressure. The multi-level speed-regulating module 28 (see FIG. 4) is connected to the power supply 4 and receives power therefrom.

As indicated in FIG. 2, in this embodiment, the housing 21 includes the two cavities 23 in communication with the first blowers 22. Each of the cavities 23 includes an air inlet part 24 that protrudes out of backpack body 18 (see FIGS. 1, 3, 5, 6, and 8) and receives lower-temperature air from outside the backpack 10 (see FIGS. 1, 3, 5, 6, and 8). Each of the cavities 23 and/or the first blowers 22 is in communication with an air outlet duct 25. The cavities 23 conduct the lower-temperature air from the air inlet parts 24 to the first blowers 22 and/or the air outlet ducts 25. The air outlet ducts 25 may extend toward one another and join together at a junction. At or near the junction of the air outlet ducts 25, there is an air outlet. The cavities 23 may be designed to enhance the airtightness, reduce air leakage, and enable the lower-temperature air to flow through the cavities 23 and into the air outlet ducts 25. The air inlet parts 24 and the air outlet allow the air to flow smoothly and the lower-temperature air to be sucked into the air inlet parts 24 and exhausted through the air outlet.

As indicated in FIG. 2, in this embodiment, an air guide duct 26 is positioned at the external side of the air outlet. The air guide duct 26 guides airflow into the air ducts 3 to prevent airflow diffusion and air leakage at the air outlet. The air generated by the first blowers 22 may gather in the air outlet ducts 25 for a sufficient amount of time to increase the air pressure inside the air outlet ducts 25, which may extend the flowing distance of the lower-temperature air within (and optionally beyond) the air ducts 3 and thus improve the heat dissipation. The air outlet and/or the air guide duct 26 may have a flat shape configured to enhance the force of the air exiting from the air guide duct 26 and increase the air pressure.

Figure 9:
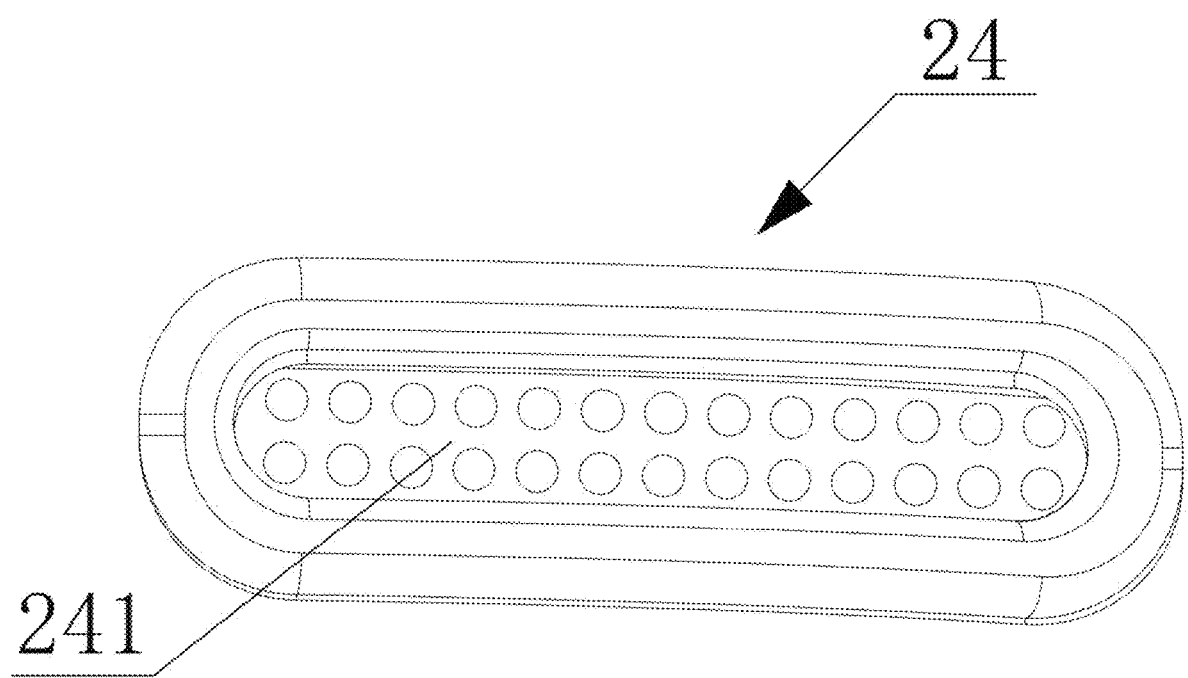
FIG. 9 is a bottom view of an air inlet of the backpack of FIG. 1.

As shown in FIG. 9, in this embodiment, each of the air inlet parts 24 is provided with a dustproof net 241. The dustproof net 241 helps prevent the corresponding first blower 22 from sucking in an external object and helps prevent the external object from blocking the air inlet part 24 and/or jamming the corresponding first blower 22.

As indicated in FIG. 4, in this embodiment, the multi-level speed-regulating module 28 includes a speed control circuit 28A, an output interface J1, and a switching circuit 28B. The speed control circuit 28A includes a multi-level switch SW1, which includes a first fixed contact FC1, a second fixed contact FC2, a third fixed contact FC3, and a moveable contact MC. The moveable contact MC is used to make a connection with one of the fixed contacts FC1-FC3. The speed control circuit 28A includes a resistor R1 and a resistor R2. One end of the resistor R1 is connected to the first fixed contact FC1 and the other end of the resistor R1 is connected to the output interface J1. One end of the resistor R2 is connected to the second fixed contact FC2 and the other end of the resistor R2 is connected to the output interface J1. The third fixed contact FC3 is connected to the output interface J1. The switching circuit 28B includes an input interface J3, a power input interface J4, and at least one blower output interface 29. The multi-level speed-regulating module 28 may include a different blower output interface for each of the at least one blower 20. Thus, in the example illustrated, the at least one blower output interface 29 includes blower output interfaces J5 and J7 for the pair of first blowers 22 (labeled "M1" and "M2," respectively). The input interface J3 is connected to the output interface J1.

The movable contact MC and the power input interface J4 are each connected to the power supply 4 (see FIG. 1) and receive power therefrom via contacts C1 and C2, respectively. The power input interface J4 may be implemented as a USB port or similar connection. The multi-level switch SW1 may be pressible by a user (e.g., the wearer) to determine which of the fixed contacts FC1-FC3 is contacted by the movable contact MC to thereby control the air speed. By way of a non-limiting example, the air speed may be at a low speed level when the movable contact MC is connected to the first fixed contact FC1, a medium speed level when the movable contact MC is connected to the second fixed contact FC2, and a high speed level when the movable contact MC is connected to the third fixed contact FC3. By way of a non-limiting example, the first fixed contact FC1 may be implemented as a first pin of the multi-level switch SW1, the second fixed contact FC2 may be implemented as a second pin of the multi-level switch SW1, the third fixed contact FC3 may be implemented as a third pin of the multi-level switch SW1, and the movable contact MC may be implemented as a fourth pin of the multi-level switch SW1. The fourth pin of the multi-level switch SW1 and a fourth pin of the output interface J1 may be connected to the power supply 4 (see FIG. 1) by the contact C1. A first pin of the power output interface J2 may be connected to the power supply 4 (see FIG. 1) by the contact C1.

The resistor R1 may have a resistance in a range of 1 kiloohm (kΩ) to 10 KΩ, and the resistor R2 may have a resistance in a range of 1 KΩ to 20 KΩ. For example, the resistor R1 may have a resistance value of 6.8 KΩ, and the resistor R2 may have a resistance value of 10 KΩ. Taking advantage of the different values of the resistors R1 and R2, the multi-level speed-regulating module 28 may provide different output voltage values, which may be used to control the voltage distributed to the first blowers 22 and regulate the air speed of the first blowers 22.

At the high-speed level (e.g., when the movable contact MC is connected to the third fixed contact FC3), the first blowers 22 may be directly connected to the power supply 4 (see FIG. 1) to receive maximum power and rotate at a maximum speed. To be specific, the other end of the resistor R1 may be connected to a second pin of the output interface J1. The other end of the resistor R2 is connected to the second pin of the output interface J1. The third fixed contact FC3 is connected to a first pin of the output interface J1.

The switching circuit 28B is connected to the first blowers M1 and M3 simultaneously. The first blower M1 is connected by an interface J6 to the blower output interface J5, and the first blower M2 is connected by an interface J8 to the blower output interface J7.

The speed control circuit 28A may include a spare resistor R6. One end of the spare resistor R6 is connected to the second pin of the output interface J1, while the other end of the spare resistor R6 is grounded. The resistance of the spare resistor R6 may be 10 kΩ. A third pin of the output interface J1 is grounded.

As indicated in FIG. 4, in this embodiment, the multi-level speed-regulating module 28 also includes an indicator module 28C, which further includes a plurality of light emitting diodes (e.g., LED1, LED2, and LED3) and a plurality of diodes (e.g., diode D1, diode D2, diode D3, diode D4, and diode D5). The first fixed contact FC1 is connected to the anode of the diode D1, the cathode of the diode D1 is connected to the anode of LED1, and the cathode of the LED1 is grounded. The second fixed contact FC2 is connected to the anode of the diode D2, and the cathode of the diode D2 is connected to the anode of LED1. The second fixed contact FC2 is connected to the anode of diode D3, the cathode of the diode D3 is connected to the anode of LED2, and the cathode of the LED2 is grounded. The third fixed contact FC3 is connected to the anode of diode D4, and the cathode of the diode D4 is connected to the anode of LED1. The third fixed contact FC3 is connected to the anode of diode D5, and the cathode of the diode D5 is connected to the anode of LED2. The third fixed contact FC3 is connected to the anode of LED3, and the cathode of LED3 is grounded. The indicator module 28C is used to prompt or inform the wearer as to a current speed level and may be used to help select a desired speed level. To be specific, at the low speed level, only the LED1 is connected and on; at the medium speed level, both the LED1 and the LED2 are connected and on; at the high speed level, the LED1, the LED2, and the LED3 are simultaneously connected and on.

The indicator module 28C includes a current-limiting resistor R3, a current-limiting resistor R4, and a current-limiting resistor R5. The current-limiting resistors R3, R4, and R5 may each have a resistance in a range of 100Ω to 2 KΩ. One end of the current-limiting resistor R3 is connected to the anode of LED1, while the other end of the current-limiting resistor R3 is connected to the cathode of the diode D1, the cathode of the diode D2, and the cathode of the diode D4. One end of the current-limiting resistor R4 is connected to the anode of the LED2, while the other end of the current-limiting resistor R4 is connected to the cathode of the diode D3 and the cathode of the diode D5. One end of the current-limiting resistor R5 is connected to the anode of the LED3, while the other end of the current-limiting resistor R5 is connected to the third fixed contact FC3 (and the anode of the diode D5).

Referring to FIG. 5, as mentioned above, the at least one blower 20 (see FIG. 2) may include the optional second blower(s) 6. Outlets 62A and 62B of each of the second blower(s) 6 are positioned in one or more of the air ducts 3. In the embodiment illustrated, there are two second blowers 6, which are positioned in the backpack body 18. Each of the second blowers 6 blows air into a different pair of the air ducts 3 through the pair of outlets 62A and 62B. Each of the outlets 62A and 62B is positioned in the middle of one of the air ducts 3. The second blowers 6 may provide additional airflow to at least some of the air ducts 3, which may help prevent the airflow from weakening in the middle and/or help boost the air pressure. The air from the second blowers 6 directly contacts the back of the human wearer, thus improving the heat dissipation (or radiation) and user comfort.

Figure 6:
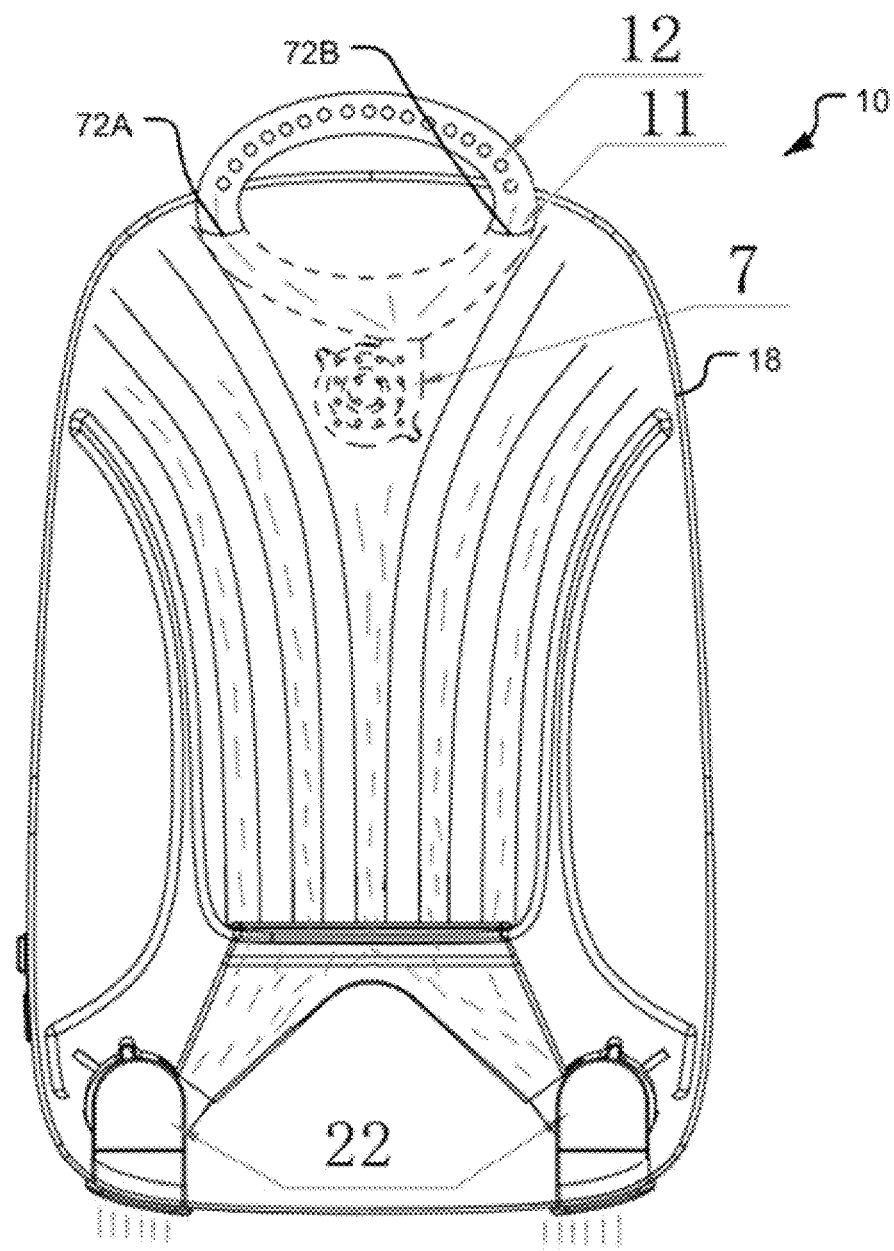
FIG. 6 is an air motion diagram illustrating airflow caused by an optional third blower of the backpack of FIG. 1.

Referring to FIG. 6, as mentioned above, the at least one blower 20 (see FIG. 2) may include the optional third blower(s) 7. In the embodiment illustrated, the backpack body 18 includes the single third blower 7, which is connected to a pair of outlets 72A and 72B. The backpack body 18 includes a hollow handle 11 with air vents 12. The outlets 72A and 72B of the third blower 7 are connected to the handle 11 and the third blower 7 blows air into the handle 11 through the outlets 72A and 72B. Specifically, the third blower 7 is positioned inside the backpack body 18. The lower-temperature air blown by the third blower 7 flows inside the handle 11 and is exhausted through the air vents 12. The exhausted air directly contacts the neck of the wearer, and improves heat dissipation (or radiation) and the wearer's comfort. The speeds of the first blowers 22, the second blowers 6, and the third blower 7 may each be within a range of 2000 revolutions per minute ("RPM") to 5000 RPM.

As indicated in FIG. 1, in this embodiment, the air ducts 3 may be curved to conform to the back of the wearer. By simulating the natural contours of the back, the air ducts 3 conform to ergonomic principles, allowing the air ducts 3 to better fit along the back of human wearer. The lower-temperature air may flow along the back of the wearer, which improves the heat dissipation (or radiation) and improves user comfort.

In this embodiment, the air ducts 3 are of uncovered trench-type ducts. In this way, the airflow experiences less resistance and the heat of the back can be dissipated quickly. The uncovered air ducts 3 also allow the airflow to directly contact the wearer's back. Alternatively, the air ducts 3 may be at least partially covered (e.g., along at least a portion of the back of the wearer).

Figure 8:
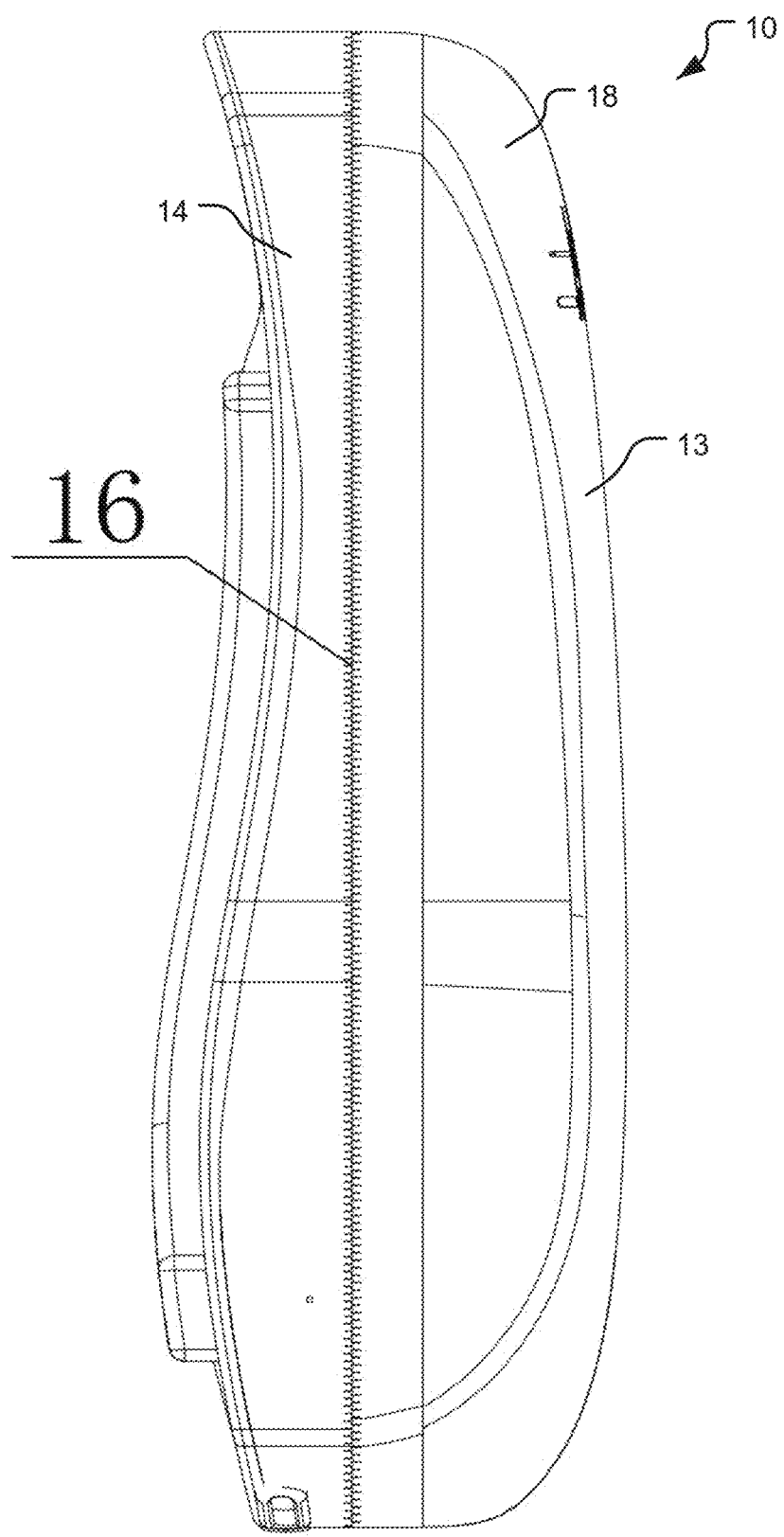
FIG. 8 is a side view of a zipper of the backpack of FIG. 1.

As indicated in FIGS. 1 and 8, in this embodiment, the backpack body 18 includes a front cover 13, a zipper 16, and a rear cover 14. The zipper 16 may removably attach the front cover 13 to the rear cover 14. Hence, the wearer may choose a favorite front cover 13 with respect to material, shape, and color. This improves the diversity of the backpack 10 and its aesthetic appeal. The front cover 13 may be made from impact resistant plastics to protect electronic equipment in the backpack 10, such as laptop, mobile tablet computer, and camera.

Figure 7:
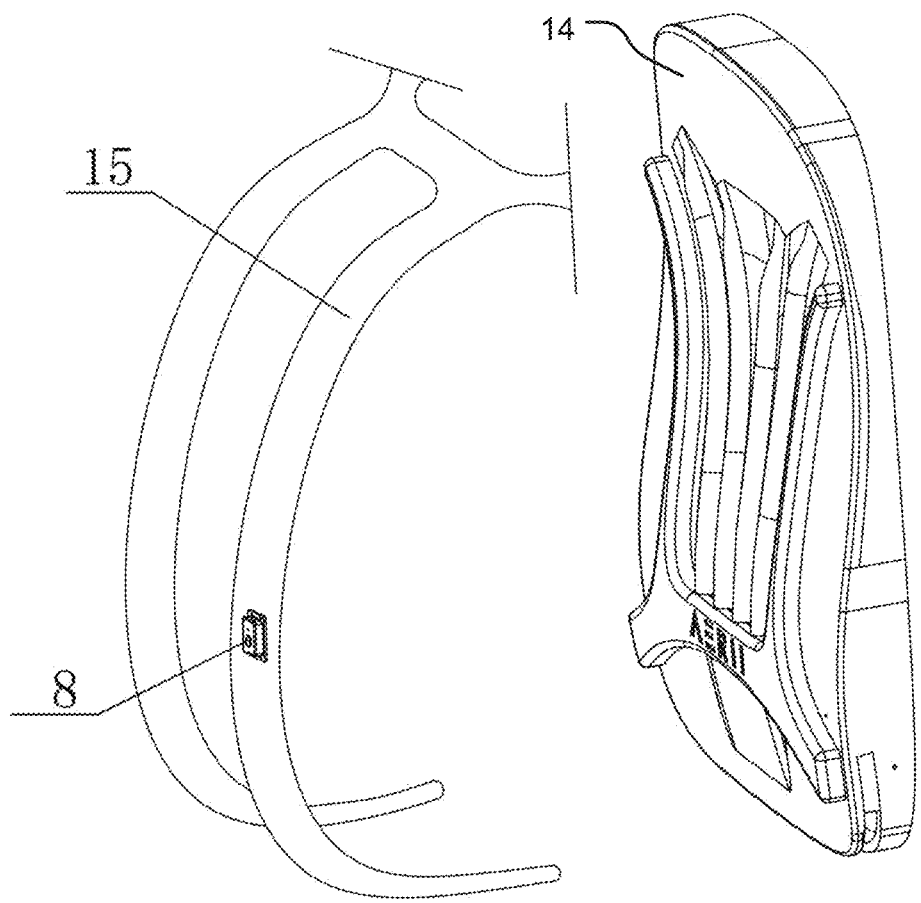
FIG. 7 is a perspective view of a backpack belt or straps with a multi-level switch of the backpack of FIG. 1.

As indicated in FIG. 7, in this embodiment, the backpack body 18 includes a backpack belt or straps 15 and a multi-level switch 8 may be positioned on one of the straps 15. The multi-level switch 8 is or operates the multi-level switch SW1 of FIG. 4.

Referring to FIG. 1, the backpack 10 may have a simple structure, provide heat dissipation, and/or charge the external electrical equipment (not shown). The backpack 10 may be easy to carry. The at least one blower 20 (see FIG. 2) may blow air in between the back of the wearer and the backpack body 18 to thereby provide airflow in this region and dissipate heat quickly. In this way, the backpack 10 lowers the temperature of the wearer's back and enhances the comfort of the wearer. The charging interface 51 may be connected to the external electrical equipment (not shown) and used to charge the external electrical equipment, which is convenient. The at least one blower 20 (see FIG. 2) and the charging interface 51 may receive power from the power supply 4 (which may be implemented as an external power supply that may be selectively connected to the multi-level speed-regulating module 28 illustrated in FIG. 4).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A backpack configured to dissipate heat along a back of a wearer, the backpack comprising:
    a backpack body having a surface configured to contact the back, the surface having at least one air duct formed therein; and
    an air moving device attached to the backpack body, the air moving device being positioned to provide an airflow to the at least one air duct, the at least one air duct conducting the airflow along the back of the wearer to thereby dissipate heat along the back of the wearer, the air moving device comprising a multi-level speed-regulating module, and one or more first blowers each connected to the multi-level speed-regulating module, the multi-level speed-regulating module being configured to control a speed of the one or more first blowers, the multi-level speed-regulating module comprising a speed control circuit, an output interface, and a switching circuit, the speed control circuit comprising a multi-level switch, which includes a first fixed contact, a second fixed contact, a third fixed contact, and a moveable contact, the moveable contact being selectively connectable to one of the first, second, and third fixed contacts, the speed control circuit comprising a first resistor and a second resistor, the first fixed contact being connected to a first end of the first resistor, a second end of the first resistor being connected to the output interface, the second fixed contact being connected to a first end of the second resistor, a second end of the second resistor being connected to the output interface, the third fixed contact being connected to the output interface, the switching circuit comprising an input interface, a power input interface, and a plurality of blower output interfaces, the input interface being connected to the output interface, and the plurality of blower output interfaces being connected one each to the one or more first blowers.

2. The backpack of claim 1, further comprising:
    a charging interface, attached to and protruding outside the backpack body, the charging interface being configured to be connected to an external electrical device and to provide electric power thereto.

3. The backpack of claim 1, wherein the air moving device comprises a housing that houses the multi-level speed-regulating module.

4. The backpack of claim 3, wherein the one or more first blowers are a plurality of first blowers,
the housing includes cavities,
the plurality of first blowers are in fluid communication with the cavities,
each of the cavities has an air inlet part that protrudes out of the backpack body,
the cavities are connected to a plurality of air outlet ducts,
each of the cavities are connected to a different one of the plurality of air outlet ducts,
the plurality of air outlet ducts are connected together at a junction, and
an air outlet is positioned at the junction.

5. The backpack of claim 4, wherein an air guide duct is positioned at an external side of the air outlet.

6. The backpack of claim 1, wherein the multi-level speed-regulating module includes an indicator module,
the indicator module includes a first light emitting diode ("LED"), a second LED, a third LED, a diode D1, a diode D2, a diode D3, a diode D4, and a diode D5,
the first fixed contact is connected to an anode of the diode D1, a cathode of the diode D1 is connected to an anode of the first LED, and the cathode of the first LED is grounded,
the second fixed contact is connected to an anode of the diode D2, and a cathode of the diode D2 is connected to the anode of the first LED,
the second fixed contact is connected to an anode of the diode D3, a cathode of the diode D3 is connected to an anode of the second LED, and a cathode of the second LED is grounded,
the third fixed contact is connected to an anode of the diode D4, and a cathode of the diode D4 is connected to the anode of the first LED,
the third fixed contact is connected to an anode of diode D5, and a cathode of the diode D5 is connected to the anode of the second LED, and
the third fixed contact is connected to an anode of the third LED, and a cathode of the third LED is grounded.

7. The backpack of claim 1, wherein the backpack body includes second blowers each having at least one outlet, and
the at least one outlet of each of the second blowers is positioned within at least one of the at least one air duct.

8. The backpack of claim 1, wherein the backpack body includes a third blower, and a hollow handle,
the third blower has an outlet,
the outlet of the third blower is connected to the hollow handle,
the hollow handle has air vents.

9. The backpack of claim 1, wherein the at least one air duct is an uncovered trench-type duct.

10. The backpack of claim 1, further comprising:
a front cover;
a rear cover; and
a zipper configured to detachably connect the front cover to the rear cover.

11. The backpack of claim 1, further comprising:
shoulder straps; and
a switch positioned on one of the shoulder straps, the switch being configured to operate the multi-level switch.

12. The backpack of claim 1, further comprising:
shoulder straps, the multi-level switch being positioned on one of the shoulder straps and determining to which of the first, second, and third fixed contacts the moveable contact is connected to thereby control an air speed of the airflow.

13. A backpack comprising:
a backpack body having at least one air duct formed therein, the at least one air duct being configured to deliver an airflow to a back of a wearer, the airflow dissipating heat along the back of the wearer; and
an air moving device positioned to provide the airflow to the at least one air duct, the air moving device comprising a multi-level speed-regulating module, and one or more first blowers each connected to the multi-level speed-regulating module, the multi-level speed-regulating module being configured to control a speed of the one or more first blowers, the multi-level speed-regulating module comprising a speed control circuit, an output interface, and a switching circuit, the speed control circuit comprising a multi-level switch, which includes a first fixed contact, a second fixed contact, a third fixed contact, and a moveable contact, the moveable contact being selectively connectable to one of the first, second, and third fixed contacts, the speed control circuit comprising a first resistor and a second resistor, the first fixed contact being connected to a first end of the first resistor, a second end of the first resistor being connected to the output interface, the second fixed contact being connected to a first end of the second resistor, a second end of the second resistor being connected to the output interface, the third fixed contact being connected to the output interface, the switching circuit comprising an input interface, a power input interface, and a plurality of blower output interfaces, the input interface being connected to the output interface, and the plurality of blower output interfaces being connected one each to the one or more first blowers, the first resistor having a first resistance value, the second resistor having a second resistance value that is different from the first resistance value.

14. The backpack of claim 13, further comprising:
a power supply connected to the air moving device and configured to provide power thereto; and
a charging interface connected to the power supply and receiving electric power therefrom, the charging interface being configured to be connected to an external electrical device and to provide the electric power thereto.

15. The backpack of claim 14, wherein the power supply is an external power supply that is removable from the backpack.

16. The backpack of claim 13,
wherein the multi-level speed-regulating module comprises a pressible switch configured to operate the multi-level switch such that when the pressible switch is pressed, the pressible switch determines a speed level of the air moving device.

17. The backpack of claim 13, wherein the air moving device is a first air moving device, and the backpack further comprises:
at least one second air moving device configured to provide additional airflow to the at least one air duct.

18. The backpack of claim 17, further comprising:
a hollow handle with at least one air vent opening; and
a third air moving device configured to deliver air into the hollow handle, the air delivered into the hollow handle exiting therefrom through the at least one air vent opening, the at least one air vent opening being positioned such that the air exiting therefrom is delivered to a neck of the wearer.

19. The backpack of claim 13, wherein the air moving device is a first air moving device, and the backpack further comprises:
a hollow handle with at least one air vent opening; and
a third air moving device configured to deliver air into the hollow handle, the air delivered into the hollow handle exiting therefrom through the at least one air vent opening, the at least one air vent opening being positioned such that the air exiting therefrom is delivered to a neck of the wearer.

20. The backpack of claim 13, wherein the at least one air duct is at least partially covered along at least a portion of the back of the wearer.

21. The backpack of claim 13, further comprising:
shoulder straps; and
a switch positioned on one of the shoulder straps, the switch being configured to operate the multi-level switch.

22. The backpack of claim 13, further comprising:
shoulder straps, the multi-level switch being positioned on one of the shoulder straps and determining to which of the first, second, and third fixed contacts the moveable contact is connected to thereby control an air speed of the airflow.

23. The backpack of claim 13, wherein the multi-level speed-regulating module includes an indicator module,
the indicator module includes a first light emitting diode ("LED"), a second LED, a third LED, a diode D1, a diode D2, a diode D3, a diode D4, and a diode D5,
the first fixed contact is connected to an anode of the diode D1, a cathode of the diode D1 is connected to an anode of the first LED, and the cathode of the first LED is grounded,
the second fixed contact is connected to an anode of the diode D2, and a cathode of the diode D2 is connected to the anode of the first LED,
the second fixed contact is connected to an anode of the diode D3, a cathode of the diode D3 is connected to an anode of the second LED, and a cathode of the second LED is grounded,
the third fixed contact is connected to an anode of the diode D4, and a cathode of the diode D4 is connected to the anode of the first LED,
the third fixed contact is connected to an anode of diode D5, and a cathode of the diode D5 is connected to the anode of the second LED, and
the third fixed contact is connected to an anode of the third LED, and a cathode of the third LED is grounded.

24. The backpack of claim 13, further comprising:
a front cover;
a rear cover; and
a zipper configured to detachably connect the front cover to the rear cover.

25. A backpack comprising:
a lower portion;
at least one air duct extending upwardly from the lower portion along a back of a wearer; and
an air moving device positioned in the lower portion and configured to provide an airflow to the at least one air duct, the at least one air duct being configured to deliver at least a portion of the airflow to at least a portion of the back of the wearer to help cool the wearer, the air moving device comprising a multi-level speed-regulating module, and one or more first blowers each connected to the multi-level speed-regulating module, the multi-level speed-regulating module being configured to control a speed of the one or more first blowers, the multi-level speed-regulating module comprising a speed control circuit, an output interface, and a switching circuit, the speed control circuit comprising a multi-level switch, which includes a first fixed contact, a second fixed contact, a third fixed contact, and a moveable contact, the moveable contact being selectively connectable to one of the first, second, and third fixed contacts, the speed control circuit comprising a first resistor and a second resistor, the first fixed contact being connected to a first end of the first resistor, a second end of the first resistor being connected to the output interface, the second fixed contact being connected to a first end of the second resistor, a second end of the second resistor being connected to the output interface, the third fixed contact being connected to the output interface, the switching circuit comprising an input interface, a power input interface, and a plurality of blower output interfaces, the input interface being connected to the output interface, and the plurality of blower output interfaces being connected one each to the one or more first blowers.

26. The backpack of claim 25, wherein the at least one air duct is contoured to conform to the back of the wearer.

27. The backpack of claim 25, wherein the at least one air duct is at least partially covered along at least a portion of the back of the wearer.

28. The backpack of claim 25, further comprising:
shoulder straps; and
a switch positioned on one of the shoulder straps, the switch being configured to operate the multi-level switch.

29. The backpack of claim 25, further comprising:
shoulder straps, the multi-level switch being positioned on one of the shoulder straps and determining to which of the first, second, and third fixed contacts the moveable contact is connected to thereby control an air speed of the airflow.

30. The backpack of claim 25, wherein the multi-level speed-regulating module includes an indicator module,
the indicator module includes a first light emitting diode ("LED"), a second LED, a third LED, a diode D1, a diode D2, a diode D3, a diode D4, and a diode D5,
the first fixed contact is connected to an anode of the diode D1, a cathode of the diode D1 is connected to an anode of the first LED, and the cathode of the first LED is grounded,
the second fixed contact is connected to an anode of the diode D2, and a cathode of the diode D2 is connected to the anode of the first LED,
the second fixed contact is connected to an anode of the diode D3, a cathode of the diode D3 is connected to an anode of the second LED, and a cathode of the second LED is grounded,
the third fixed contact is connected to an anode of the diode D4, and a cathode of the diode D4 is connected to the anode of the first LED,
the third fixed contact is connected to an anode of diode D5, and a cathode of the diode D5 is connected to the anode of the second LED, and
the third fixed contact is connected to an anode of the third LED, and a cathode of the third LED is grounded.

31. The backpack of claim 25, further comprising:
a front cover;
a rear cover; and a zipper configured to detachably connect the front cover to the rear cover.

* * * * *